United States Patent [19]
Dickhut et al.

[11] Patent Number: 5,257,924
[45] Date of Patent: Nov. 2, 1993

[54] PLASTIC TILE CORRUGATOR

[75] Inventors: Heinrich Dickhut, Charleston; John S. Berns, Cleveland, both of Tenn.

[73] Assignee: Cullom Machine Tool & Die, Inc., Cleveland, Tenn.

[21] Appl. No.: 901,503

[22] Filed: Jun. 19, 1992

[51] Int. Cl.$^5$ ............................................. B29C 53/30
[52] U.S. Cl. ................................. 425/326.1; 264/286; 264/506; 264/508; 425/376.1; 425/388; 425/392; 425/396
[58] Field of Search ................. 264/209.3, 210.1, 286, 264/506, 508; 425/303, 325, 326.1, 376.1, 336, 369, 370, 387.1, 388, 392, 396, 812, DIG. 5, DIG. 60

[56] References Cited

U.S. PATENT DOCUMENTS

| | | |
|---|---|---|
| 3,776,679 | 12/1973 | Hegler . |
| 4,165,214 | 8/1979 | Lupke et al. . |
| 4,199,314 | 4/1980 | Lupke et al. . |
| 4,374,079 | 2/1983 | Fouss et al. . |
| 4,439,130 | 3/1984 | Dickhut et al. . |
| 4,492,551 | 1/1985 | Hegler et al. . |
| 4,504,206 | 3/1985 | Lupke et al. ................ 425/336 |
| 4,681,526 | 7/1987 | Lupke ........................ 425/326.1 |
| 4,718,844 | 1/1988 | Dickhut et al. . |
| 4,952,362 | 8/1990 | Jarvenkyla et al. ......... 425/326.1 |
| 5,059,109 | 10/1991 | Dickhut et al. . |

Primary Examiner—Scott Bushey
Attorney, Agent, or Firm—Wood, Phillips, VanSanten, Hoffman & Ertel

[57] ABSTRACT

An apparatus for forming tubular tile, including an endless trackway having at least two substantially straight portions defining first and second molding sections, a plurality of mold blocks supported for movement about the trackway, and a plurality of mating mold blocks supported for mating with the first mold blocks along each molding section to form a segment of a corrugated molding tunnel. Extruders introduce moldable material at the beginning of each molding section, and the material is conformed to the molding tunnel along the molding sections for forming the tile, with the mold blocks being separated when they move past the end of each molding section. The extruders are mounted for movement toward the beginning of the two molding sections when initiating tile formation therein. A plurality of mold assemblies each support a pair of mold blocks for movement about the trackway, and the mold blocks are supported thereon for pivotal movement about an axis extending substantially in the direction of movement of the mold assemblies about the trackway. Rolling followers associated with each of the mold blocks and a cam surface associated with the trackway cooperate to position the mold blocks as desired throughout their movement.

23 Claims, 3 Drawing Sheets

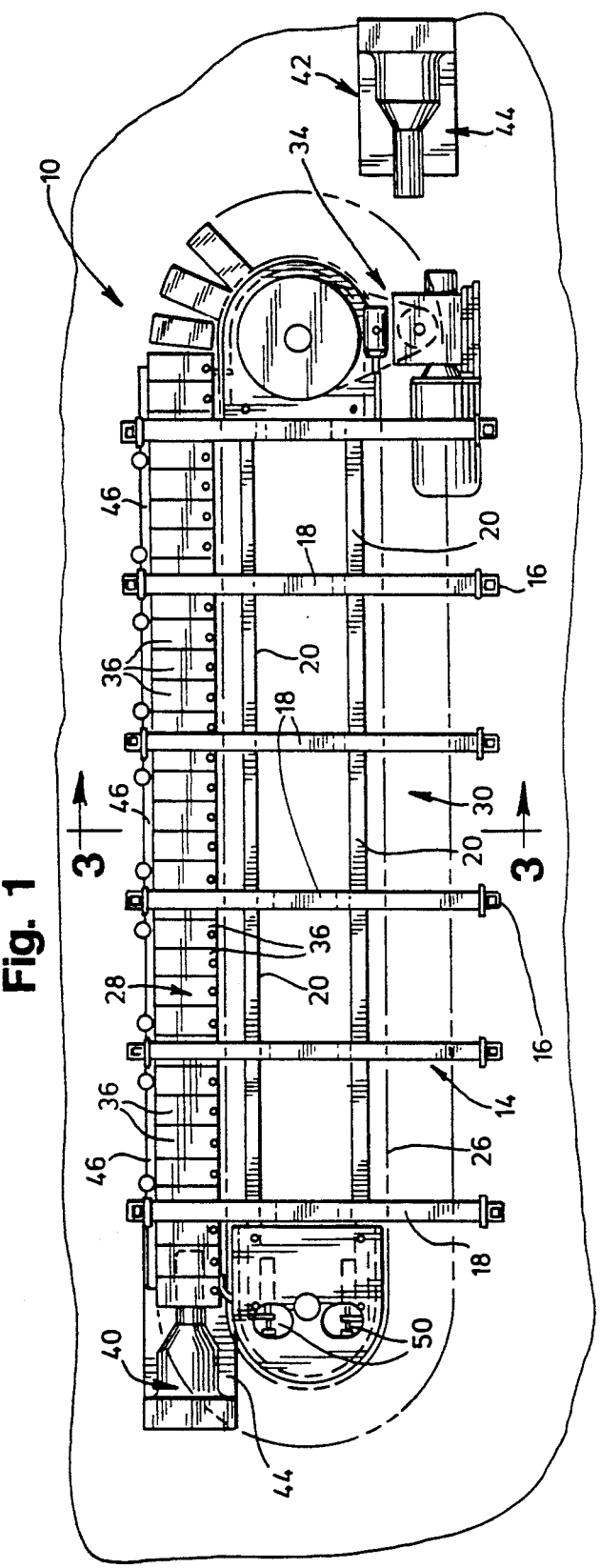
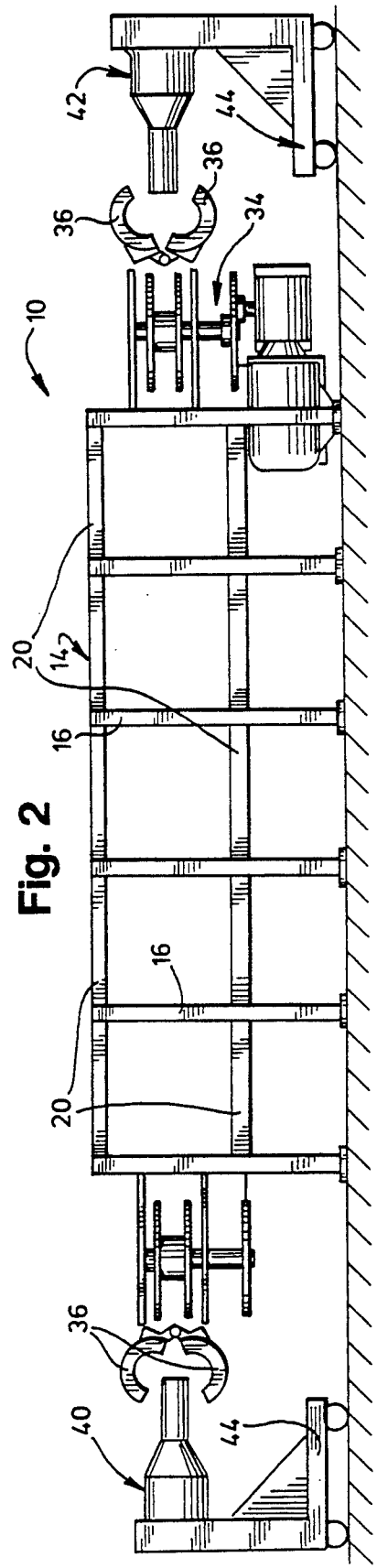

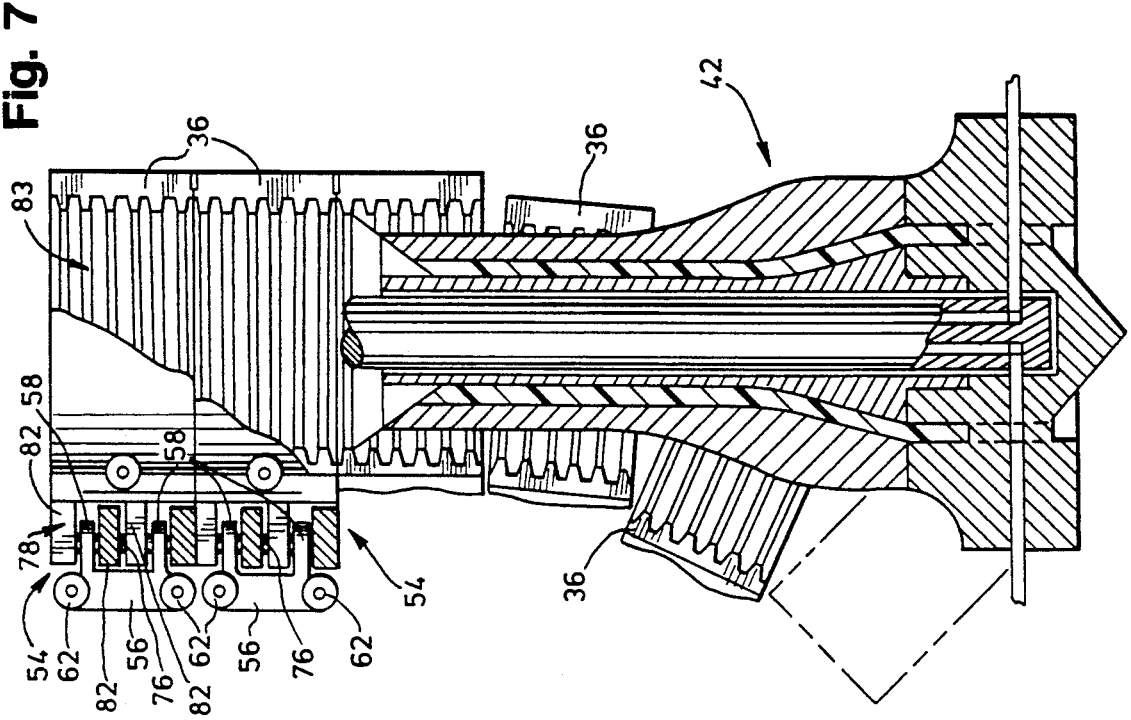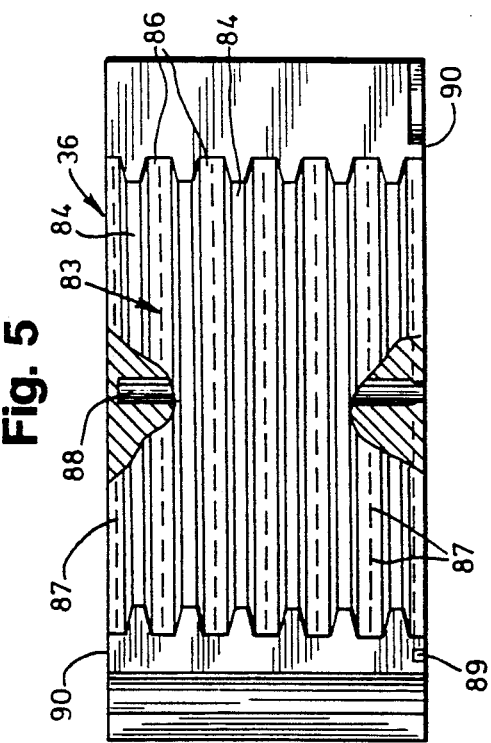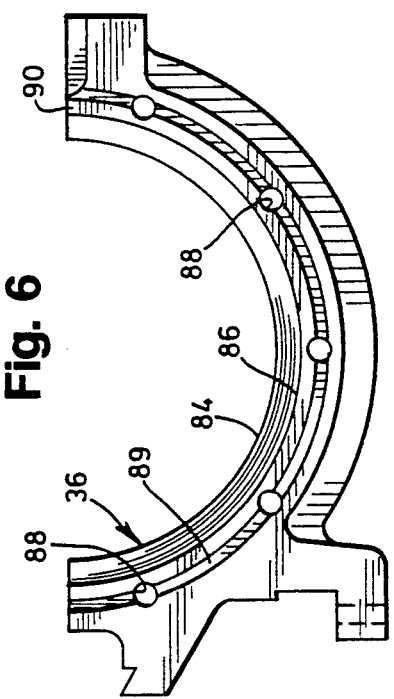

PLASTIC TILE CORRUGATOR

BACKGROUND OF THE INVENTION

1. Technical Field

The present invention is directed toward corrugators, and more particularly toward plastic tile corrugators.

2. Background Art

Due to the utility of corrugated plastic tiles, for example, as buried drainage conduits, there is a substantial need for devices which can continuously and efficiently mold lengths of corrugated plastic tiles.

Several such devices are shown, for example, in U.S. Pat. Nos. 4,165,214, 4,199,314, 4,439,130, 4,492,551, 4,718,844, and 5,059,109. These prior art devices provide varying degrees of efficiency and produce varying quality tiles.

However, generally speaking, each of these prior art devices include mold blocks which define half (180 degrees) of a generally tubular mold tunnel when mated together in a substantially straight molding section. These mold blocks are generally either carried about one continuous pathway and mated together in a clamshell type of arrangement along the molding section, or are carried about two continuous pathways with one side of each such pathway bringing the mold blocks together in mating relationship to similarly form a molding section. The mold blocks are separated at both the beginning and end of the molding section to allow introduction of extruded plastic for molding at the beginning of the molding section and to allow the mold blocks to be drawn clear of the molded tile at the end of the molding section.

Along the molding section of the above referenced prior art devices, extruded plastic is caused to conform to the mold tunnel. Since the mold tunnel is typically not uniform (that is, it is corrugated with grooves and lands along its length), it is important that this be properly accomplished, as by drawing a vacuum outside the extruded plastic, introducing a pressure within the extruded plastic, or some combination thereof. Where vacuum molding is done, passages have been provided within the mold blocks to allow the extruded plastic to be drawn to the mold tunnel about the inner periphery of the mold blocks.

Of course, as with any device, it is desirable to be able to operate at maximum efficiency, with a maximum output rate, in order to maximize the revenue realized from its use. That need is particularly true with these devices in view of the relatively high initial cost of the device and the related relatively high revenue requirements needed simply to recoup that initial cost. Because of the relatively low unit cost of the tiles produced by such devices, high quantities of manufactured tiles are needed to meet those revenue requirements. Those revenue requirements are further increased by the need for, and cost of, different sets of mold blocks for each different size of corrugated tile to be manufactured.

The present invention is directed toward overcoming one or more of the problems set forth above.

SUMMARY OF THE INVENTION

In one aspect of the present invention, an apparatus for forming tubular tile is provided, including an endless trackway having at least two substantially straight portions defining first and second molding sections, a plurality of mold blocks supported for movement about the trackway, and a plurality of mating mold blocks supported for mating with the first mold blocks along each molding section to form a segment of a corrugated molding tunnel. Extruders introduce moldable material at the beginning of each molding section, and the material is conformed to the molding tunnel along the molding sections for forming the tile, with the mold blocks being separated when they move past the end of each molding section.

In another aspect of the present invention, first and second plastic extruders are provided, one being mounted for movement toward the beginning of one molding section when initiating tile formation therein, and the other being mounted for movement toward the beginning of other molding section when initiating tile formation therein.

In still another aspect of the present invention, a plurality of mold assemblies are provided, each supporting a pair of mold blocks for movement about the trackway with the mold blocks being pivotally supported thereon for pivotal movement about an axis extending substantially in the direction of movement of the mold assemblies about the trackway.

In yet another aspect of the present invention, rolling followers are associated with each of the mold blocks and a cam surface is associated with the trackway and cooperates with the rolling followers to position the mold blocks as desired throughout their movement.

It is an object of the present invention to provide a device for forming moldable material into a high quality continuous tile.

It is another object of the present invention to provide an efficient plastic tile corrugator.

It is still another object of the present invention to provide a plastic tile corrugator which maximizes the number of feet per minute of corrugated plastic tile which can be produced by the corrugator.

It is yet another object of the present invention to provide a plastic tile corrugator which minimizes per unit output cost.

BRIEF DESCRIPTION OF THE DRAWINGS

FIG. 1 is a top view of an embodiment of the tile corrugator of the present invention with some parts removed for clarity;

FIG. 2 is a side view of the FIG. 1 embodiment, again with some parts removed for clarity;

FIG. 5 is a plan view of one embodiment mold block useable with the present invention with portions thereof removed for clarity;

FIG. 6 is a rear end view of the mold block of FIG. 5; and

FIG. 7 is a view of an embodiment of the present invention illustrating the extrusion of plastic into one mold tunnel of the tile corrugator.

DESCRIPTION OF THE PREFERRED EMBODIMENT

Figure 3:
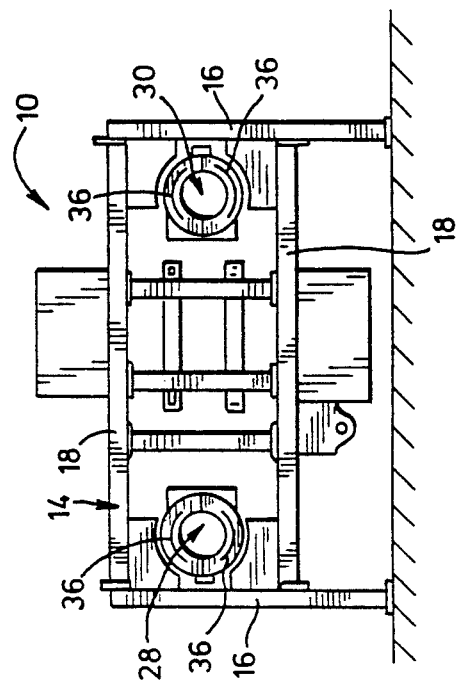
FIG. 3 is an end cross-sectional view taken along line 3—3 of FIG. 1.

An overview of a preferred embodiment of a corrugator 10 incorporating the present invention is provided in FIGS. 1-3 Generally speaking, the overall structure of the illustrated embodiment is similar to that of the corrugator disclosed in U.S. Pat. No. 4,439,130, the detailed disclosure of which is hereby incorporated by reference Details of the corrugator 10 have been omitted from the figures in order to more clearly illustrate the invention. However, it should be understood that such details are not directly relevant to the concept of the present invention, and that different types of corrugators (naturally including different details) could also incorporate the present invention. That is, whereas the illustrated embodiment uses vacuum to conform the plastic to the mold blocks as described in detail hereafter, the present invention could be used with different mold blocks, etc., or could even be used with a corrugator structure which uses different means, such as internal pressure, to conform the plastic to the mold blocks.

Referring now specifically to FIGS. 1-3, the corrugator 10 includes an upstanding frame 14 including connected upright members 16, lateral members 18, and longitudinal members 20. The frame 14 supports a trackway 26 in the form of a continuous loop with opposite straight sections defining first and second mold sections 28, 30. A suitable drive 34 is provided to move the mold blocks 36 about the trackway 26 as described in greater detail hereafter. The trackway 26 is generally horizontal, that is, the mold blocks 36 are carried by the trackway 26 for movement in a substantially horizontal plane.

Extruders 40, 42 are provided adjacent the beginning of each mold section 28, 30. As best illustrated schematically in FIG. 2, both extruders 40, 42 are mounted to a support 44 which allows for the extruders 40, 42 to be moved back and forth toward and away from the beginning of the associated mold section 28, 30 when the corrugator 10 is started up and shut down, respectively. Of course, the extruders 40, 42 could still be generally secured in fixed locations (as with most prior art structures), with only components thereof (including the extruder dies) being movable back and forth toward and away from the beginning of the mold sections 28, 30.

Vacuum manifolds 46 are provided along both of the mold sections 28, 30 (only one such manifold 46 is shown in FIG. 1, the other being a mirror image of it along the other mold section 30). These manifolds 46 are connected to a port in the mold blocks 36 as described hereafter to draw a vacuum around the outside of the extruded plastic in the molding sections 28, 30. Of course, as previously noted, still other structures could be used within the scope of the invention, including the use of internal pressure in the mold sections 28, 30 rather than vacuum to conform the plastic to the mold blocks 36.

Since the continuous reception by the corrugator 10 of heated thermoplastic often results in the mold blocks 26 achieving an elevated equilibrium temperature, adjustment assemblies 50 are preferably provided to allow for suitable adjustment of the trackway 26 (as by adjusting the overall length of the trackway 26). As a result, thermal expansion is accommodated without wear between adjacent mold blocks and free rolling action of the mold assemblies described hereafter will not be impaired.

A plurality of mold assemblies 54 are supported and guided by the trackway 26 for rolling action therealong. Preferably, all mold assemblies 54 are alike, and therefore only one is described in detail with reference to FIG. 4.

Each mold assembly 54 has a carriage 56 supporting a pair of outwardly extending eyelets 58. Extending from the sides of the carriage 56 are axles 60 on which are journaled rollers 62. Preferably, four axles 60 and rollers 62 are provided with each assembly 54 to properly guide the mold assemblies 54 about the trackway 26. The rollers 62 are received by and freely roll within the trackway 26 to enable the mold assemblies 54 and more particularly the carriages 56 to roll therealong.

To maintain the mold assemblies 54 in mutual alignment and to assure that their carriages 56 properly roll within the trackway 26, a guide 66 is provided between track supports 68 along both of the mold sections 28, 30. The guide 66 has a pair of spaced walls 70 which define a guideway 72. Disposed transverse to the carriage 56 for reception by rolling action within the guideway 72 is a guide roller 74.

It should now thus be seen that the mold assemblies 54 are able to roll about the corrugator trackway since the carriage rollers 62 are received in and roll along the endless trackway 26. The aforementioned rolling of the mold assemblies 54 is guided by the rolling of their guide rollers 74 within the guideway 72.

Secured between the eyelets 58 of each mold assembly 54 is shaft 76 upon which first and second mold block mounts 78, 80 are pivotally mounted. Both mounts 78, 80 include a pair of pivot arms 82 (see FIGS. 4 and 7) which are pivotally mounted to the shaft 76. Suitable means are provided for mounting top and bottom mold blocks 36 to the mounts 78, 80. Such mounting means are preferably easily manipulated to remove or attach or detach the mold blocks 36 from the mounts 78, 80 so that mold blocks 36 can be easily changed when it is desirable to change the size of the tile formed by the corrugator 10.

The top and bottom mold blocks 36 are essentially the mirror image of each other, and each is semi-cylindrical having a corrugated inner wall 83 formed by alternating grooves 84 and lands 86 (according to the convention used herein, the grooves 84 are actually the raised portions of the inner wall 83 [they create the grooves in the formed tile] and the lands 86 are the grooves in the inner wall [as they form the lands in the tile]).

As best shown in FIGS. 5 and 6, the mold blocks 36 include a passageway for connecting the mold tunnel with the vacuum manifold, the passageway being defined by a plurality of slits 87 in the lands 86 intersecting axial bores 88 in the mold blocks 36, where the bores 88 are connected by an annular groove 89 in one end face of the mold block 36. The groove 89 opens to the outside of the blocks 36 for connecting with the vacuum manifolds. Each end of the mold blocks 36 preferably include flat end faces 90 so that adjacent mold blocks 36 closely abut one another to both close off the groove 89 of an abutting block and to form a closed molding tunnel along each mold section 28, 30.

It should be understood, however, that still other mold block structures could be used within the scope of the present invention For example, the above described passageway could be eliminated, or far different passageways could be used merely for venting, in structures using internal pressure for molding. Even for vacuum molding, there are other structures which could be suitably used within the scope of the present invention, such as illustrated in U.S. Pat. Nos. 4,718,844 and 5,059,109, the detailed disclosures of which are hereby incorporated by reference.

Figure 4:
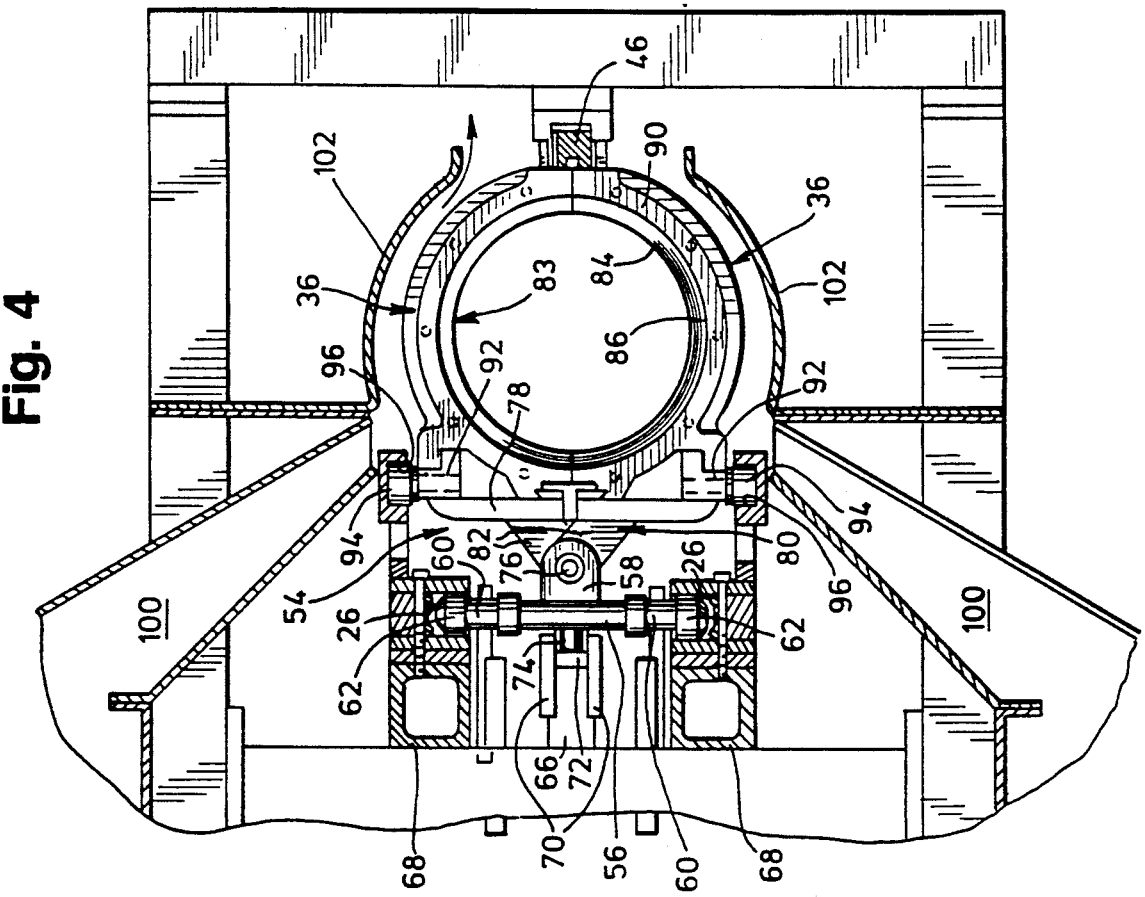
FIG. 4 is an enlarged partial section view of an embodiment of the tile corrugator of the present invention illustrating a mold assembly thereof.

For proper operation of the preferred embodiment of the corrugator 10, the mold blocks 36 must pivotally close together to form a molding tunnel as they begin travel down each mold section 28, 30 (see FIG. 7), and must thereafter pivotally separate clear of a formed tile at the end of travel down each mold section 28, 30. Accordingly, as shown in FIG. 4, each mold assembly 54 has a pair of opposing follower axles 92 to which are journaled roller bearings which define followers 94. Cooperating with the followers 94 to open and close the mold blocks 36 are cam guideways or surfaces 96 disposed about the trackway 26. The cam surfaces 96 are oriented about and relative to the trackway 26 so that the mold block followers 94 and the carriage rollers 62 move parallel to one another through the mold sections 28, 30, whereas from the end of one mold section 28 or 30 to the beginning of the next mold section 30 or 28, the cam surfaces 96 are twisted and moved relative to the trackway 26 so as to pivot the mold blocks 36 about the pivot shaft 76 to open and then reclose the mold blocks 36.

As best shown in FIG. 4, a suitable cooling plenum 100 through which cooling air is supplied is preferably provided on both the top and bottom along the length of the mold sections 28, 30. Shields 102 are also provided about the mold sections 28, 30 to guide the cooling air about the outer periphery of the mold blocks 36 to maximize cooling as is desired not only to aid in hardening the extruded plastic once it is formed along a molding section 28 or 30 but also to ensure that the temperature of the mold blocks 36 does not become improperly elevated following long periods of use.

If desired, additional cooling could also be provided between the mold sections 28, 30, including lengthening the distance between the mold sections 28, 30 in order to provide additional time between sections for cooling, or by blowing cooling air into the vacuum ports at the end of and between mold sections 28, 30. Alternatively, the mold sections 28, 30 could themselves be constructed in a sufficient length so that adequate cooling could be provided during travel over that length (for example, additional cooling could be provided during the travel of the mold blocks 36 along an added length at the end of the mold sections 28, 30).

With the embodiment shown, the carriages 56 are preferably separate from one another, with the drive 34 functioning to push them about the trackway 26 (for example, by providing a sprocket drive at the beginning of each mold section 28, 30 to push the entering mold blocks 36 and the ones ahead of them along the molding sections 28, 30).

It should be understood, however, that still other structures for carrying the mold blocks could be used within the scope of the present invention, including, for example, a chain drive about the trackway with mold blocks attached about the length of the chain. Still further, rather than the structure shown in the figures in which mating mold blocks 36 are carried about a single trackway 26, some advantages of the present invention could also be obtained by providing three (or more) adjacent trackways, each of which carry a single set of half mold blocks (i.e., for defining only one side of a mold tunnel). In such a structure, the middle trackway could include two straight sections, each being adjacent a straight section of one of the adjacent side trackways The side trackways would be oriented relative to the middle trackway so that their mold blocks (defining one side of a mold tunnel along their straight section) would mate with the mold blocks along the adjacent straight section of the middle trackway to thereby define two mold sections one along each pair of adjacent trackway straight sections. Of course, it should be understood that in a three trackway structure as described, if the trackways are essentially the same length, the mold blocks of the middle trackway would be used twice as much as the mold blocks of the side trackways and therefore could require additional cooling.

The preferred embodiment shown in the figures could theoretically double the output of a corrugator without requiring any additional mold blocks, with clear significant cost savings. A three trackway embodiment such as described above could theoretically increase the output of a corrugator by 100% while requiring only an additional 50% mold blocks. Similarly, a four trackway structure (with two middle trackways and three mold sections) would double the number of mold blocks used but could theoretically triple corrugator output.

It should thus be apparent that corrugators made according to the present invention will efficiently manufacture high quality corrugated plastic tile in a manner which will maximize the number of feet per minute of corrugated plastic tile which can be produced and minimize the per unit output cost.

Still other aspects, objects, and advantages of the present invention can be obtained from a study of the specification, the drawings, and the appended claims.

We claim:

1. An apparatus for forming tubular tile, comprising:
   an endless trackway including at least two substantially straight portions defining first and second molding sections, each molding section having a beginning and an end;
   a plurality of first mold blocks supported for movement about said trackway;
   a plurality of mating mold blocks which when mated with one of the first mold blocks define a segment of a corrugated molding tunnel;
   means supporting said mating mold blocks for mating with first mold blocks along said first and second molding sections;
   means for introducing moldable material at the beginning of each molding section;
   means for conforming the introduced material to the molding tunnel along said molding sections for forming the tile; and
   means for separating said first mold blocks from said mating mold blocks when said first mold blocks move past the end of each molding section.

2. The apparatus of claim 1, wherein said conforming means comprises:
   passageways in said mold blocks connecting the molding tunnels to exterior ports in said mold blocks; and
   a vacuum applied to the mold block ports along said molding sections.

3. The apparatus of claim 1, wherein said moldable material is extruded plastic, and further comprising first and second plastic extruders, said first extruder extruding plastic which is received in the molding tunnel at the beginning of the first molding section, and said second extruder extruding plastic which is received in the molding tunnel the beginning of the second molding section.

4. The apparatus of claim 3, further comprising:
   means mounting the first extruder for movement toward the beginning of the first molding section when initiating tile formation therein; and means mounting the second extruder for movement toward the beginning of the second molding section when initiating tile formation therein.

5. The apparatus of claim 1, wherein said supporting means comprises a plurality of mold assemblies supported for movement about said trackway, each of said assemblies having one of the first mold blocks and one of the mating mold blocks supported thereon for movement into and out of mating.

6. The apparatus of claim 5, wherein said mold blocks are pivotally supported on said mold assemblies for pivotal movement about an axis extending substantially in the direction of movement of the mold assemblies about the trackway.

7. The apparatus of claim 5, further comprising a first cam structure for moving said first mold blocks and mating mold blocks into mating.

8. The apparatus of claim 7, wherein said separating means comprises a second cam structure at the end of each molding section.

9. The apparatus of claim 8, wherein said first and second cam structures comprise a rolling follower associated with each of said mold blocks and a cam surface associated with the trackway and cooperating with the rolling followers.

10. The apparatus of claim 1, wherein said mold blocks define a corrugated mold tunnel for forming a corrugated tile when said plastic is conformed thereto in either of said mold sections.

11. The apparatus of claim 1, wherein said mold sections are substantially parallel to one another.

12. An apparatus for forming tubular tile of extruded plastic, comprising:
a frame having an endless trackway thereabout, said trackway including at least two substantially straight portions defining first and second molding sections, each of said molding sections having a beginning and an end;
a plurality of mold assemblies supported for continuous movement about said trackway, each of said mold assemblies pivotally opening and closing a pair of mold blocks which when closed define a segment of a corrugated molding tunnel;
first means for closing mold block pairs over plastic from a first extruder as their associated mold assembly enters the first molding section;
first means for conforming the plastic to the molding tunnel formed by the closed mold block pairs through the first molding section;
first means for opening mold block pairs as their associated mold assembly reaches the end of the first molding section;
second means for closing mold block pairs over plastic from a second extruder as their associated mold assembly enters the second molding section;
second means for conforming the plastic to the molding tunnel formed by the closed mold block pairs through the second molding section;
second means for opening mold block pairs as their associated mold assembly reaches the end of the second molding section.

13. The apparatus of claim 12, wherein said first and second conforming means comprise:
passageways in said mold blocks connecting the molding tunnels to exterior ports in said mold blocks;
a first vacuum plenum communicating with the mold block ports along said first molding section; and
a second vacuum plenum communicating with the mold block ports along said second molding section.

14. The apparatus of claim 12, further comprising first and second plastic extruders, said first extruder extruding plastic which is received in the molding tunnel at the beginning of the first molding section, and said second extruder extruding plastic which is received in the molding tunnel the beginning of the second molding section.

15. The apparatus of claim 14, further comprising:
means mounting the first extruder for movement toward the beginning of the first molding section when initiating tile formation therein; and
means mounting the second extruder for movement toward the beginning of the second molding section when initiating tile formation therein.

16. The apparatus of claim 12, wherein said mold blocks are pivotable about an axis extending substantially in the direction of movement of the mold assemblies about the trackway.

17. The apparatus of claim 12, wherein:
said first and second closing means each comprise a first cam structure at the beginning of each molding section; and
said first and second opening means each comprise a second cam structure at the end of each molding section.

18. The apparatus of claim 17, wherein said first and second cam structures comprise a rolling follower associated with each of said mold blocks and a cam surface associated with the trackway and cooperating with the rolling followers.

19. The apparatus of claim 12, wherein said mold blocks define a corrugated mold tunnel for forming a corrugated tile when said plastic is conformed thereto in either of said mold sections.

20. The apparatus of claim 12, further comprising means mounting the extruders for movement toward the beginning of the molding sections when initiating tube formation in the molding section.

21. An apparatus for forming corrugated plastic tile, comprising:
a frame having an endless trackway thereabout, said trackway including two straight and substantially parallel portions defining first and second molding sections, each of said molding sections having a beginning and an end;
a plurality of mold assemblies supported for continuous movement about said trackway, each of said mold assemblies including a pair of mold blocks supported for pivoting about an axis extending substantially in the direction of movement of the mold assemblies about the trackway, said mold block pairs defining a segment of a corrugated molding tunnel when abutting;
a first plastic extruder mounted for movement toward the beginning of the first molding section when initiating tile formation therein to extrude plastic which is received in the molding tunnel at the beginning of the first molding section;
a second plastic extruder mounted for movement toward the beginning of the second molding section when initiating tile formation therein to extrude plastic which is received in the molding tunnel at the beginning of the second molding section;
first means for pivoting mold block pairs into abutting relationship as their associated mold assembly moves toward the beginning of the first molding section;

first means for conforming the plastic to the molding tunnel formed by closed mold block pairs moving along the first molding section;

first means for pivoting said mold block pairs apart as their associated mold assembly reaches the end of the first molding section;

second means for pivoting mold block pairs into abutting relationship as their associated mold assembly moves toward the beginning of the second molding section;

second means for conforming the plastic to the molding tunnel formed by closed mold block pairs moving along the second molding section; and second means for pivoting said mold block pairs apart as their associated mold assembly reaches the end of the second molding section.

22. The apparatus of claim 21, wherein said first and second conforming means comprise:

passageways in said mold blocks connecting the molding tunnels to exterior ports in said mold blocks;

a first vacuum plenum communicating with the mold block ports along said first molding section; and a second vacuum plenum communicating with the mold block ports along said second molding section.

23. The apparatus of claim 21, wherein said pivoting means collectively comprise rolling followers associated with each of said mold blocks and cam surfaces associated with the trackway and cooperating with the rolling followers to cam each mold block to pivoting into the selected relationship relative to the other mold block of the pair.

* * * * *